United States Patent
Connor et al.

(10) Patent No.: US 8,530,106 B2
(45) Date of Patent: Sep. 10, 2013

(54) END CELL THERMAL BARRIER HAVING VARIABLE PROPERTIES

(75) Inventors: Eric J. Connor, Rochester, NY (US); Todd D. Bogumil, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 12/784,882

(22) Filed: May 21, 2010

(65) Prior Publication Data

US 2011/0287332 A1 Nov. 24, 2011

(51) Int. Cl.
*H01M 8/04* (2006.01)

(52) U.S. Cl.
USPC ............ 429/433; 429/400; 429/434; 429/436

(58) Field of Classification Search
USPC .................................. 429/400, 433, 434, 436
See application file for complete search history.

(56) References Cited

U.S. PATENT DOCUMENTS

| | | | |
|---|---|---|---|
| 6,866,954 B2 | 3/2005 | Hayashi et al. | |
| 6,953,632 B2 | 10/2005 | Hayashi et al. | |
| 7,014,935 B2 | 3/2006 | Knights et al. | |
| 7,160,640 B2 | 1/2007 | Houlberg | |
| 7,163,760 B2 | 1/2007 | Tanaka et al. | |
| 7,201,981 B2 | 4/2007 | Enjoji et al. | |
| 2003/0010809 A1* | 1/2003 | Lewandowski et al. | ... 228/122.1 |

\* cited by examiner

*Primary Examiner* — Jane Rhee
(74) *Attorney, Agent, or Firm* — Fraser Clemens Martin & Miller LLC; J. Douglas Miller

(57) ABSTRACT

A fuel cell assembly is disclosed, the fuel cell assembly including a plurality of fuel cell plates arranged in a stack, each fuel cell plate having reactant inlets and outlets and a coolant inlet and outlet; a first terminal plate disposed at a first end of the stack of the fuel cell plates; and a barrier layer disposed between one of the plurality of fuel cell plates and the first terminal plate to provide a thermal barrier therebetween, wherein the barrier layer includes a first portion having a first thermal conductivity and a second portion having a second thermal conductivity.

20 Claims, 3 Drawing Sheets

END CELL THERMAL BARRIER HAVING VARIABLE PROPERTIES

FIELD OF THE INVENTION

The invention relates to a fuel cell assembly, and more specifically to a fuel cell assembly including a barrier layer having variable properties disposed between a terminal plate and an end plate thereof to facilitate startup of the assembly in freezing external temperatures and minimize the temperature in an end unit of the assembly at high current levels.

BACKGROUND OF THE INVENTION

Fuel cell assemblies convert a fuel and an oxidant to electricity. One type of fuel cell power system employs a proton exchange membrane (hereinafter "PEM") to separate electrodes that facilitate catalytic reaction of fuels (such as hydrogen) and oxidants (such as air or oxygen) to generate electricity. The PEM is typically a solid polymer electrolyte membrane that facilitates transfer of protons from an anode to a cathode in each individual fuel cell normally deployed in a fuel cell power system.

In a typical fuel cell assembly (or stack) within a fuel cell power system, individual fuel cell plates include channels through which various reactants and cooling fluids flow. Fuel cell plates are typically designed with straight or serpentine flow channels. Such flow channels are desirable as they effectively distribute reactants over an active area of an operating fuel cell, thereby maximizing performance and stability. In subzero temperatures, water vapor in the fuel cell assembly may condense. The condensate may form ice in the fuel cell assembly. The presence of condensate and ice may affect the performance of the fuel cell assembly.

During typical operating conditions, condensate may also accumulate at the edges of the fuel cell plates adjacent outlet manifolds of the fuel cell assembly, thereby restricting fluid flow from the flow channels to the outlet manifolds. During a starting operation of the fuel cell assembly in subzero temperatures, the condensed water in the flow channels of the fuel cell plates and at the edges of the outlet manifolds is in the form of ice which may restrict reactant flow. Similarly, reactant flow maldistribution due to liquid water stagnation during normal operation can result. Furthermore, thermal energy generated by the fuel cells of the assembly is lost to end units of the assembly, thereby delaying the heating of the assembly.

Typically, to mitigate the formation of condensation at the outlet manifolds of the fuel cell assembly, the operating temperature of the fuel cell assembly is increased. However, increasing the operating temperature may have a negative impact on ohmic resistance due to increased membrane proton resistance as a result of decreased membrane humidification. Also, decreasing the relative humidity of inlet anode and cathode gas streams may achieve the same effect as increasing the operating temperature and result in a negative impact on ohmic resistance due to increased membrane proton resistance. To mitigate thermal losses to the end units of the assembly, a thermally resistive barrier layer may be disposed between the fuel cell stack and the end units. As thermal resistivity increases, electrical conductance decreases, thereby generating waste heat in the barrier layer and causing the fuel cell assembly to operate inefficiently. To withstand the elevated temperatures that can arise at high current levels due to this waste heat generation in the barrier layer, the end units must be formed from expensive plastics or other materials able to withstand elevated temperatures, thereby increasing the cost of the fuel cell assembly.

During operation of the fuel cell assembly, waste heat from the fuel cell reaction heats the fuel cell assembly and mitigates water condensation and ice formation in the assembly. However, end plates of the fuel cell assembly tend to have a temperature lower than the temperature of intermediate plates of the fuel cell assembly. The end plates have a lower temperature due to thermal losses to the environment and thermal losses to terminal plates and end units of the fuel cell assembly adjacent thereto. A difference in the temperature of the fuel cell plates throughout the fuel cell assembly may result in inefficient operation, maldistribution of reactants, condensation of water on the fuel cell plates which may lead to ice formation, and a decreased useful life of the fuel cell assembly.

Typically, to ensure a substantially uniform temperature distribution between the plates in the fuel cell assembly, a heating mechanism is disposed adjacent the end plates to directly transfer thermal energy thereto. A heating mechanism may also be disposed adjacent the terminal plates to transfer thermal energy thereto. Thermal energy is then transferred from the terminal plates to the end plates. Alternatively, a resistive heating mechanism adapted to heat the end plates may be connected in parallel to the fuel cell assembly. If a heating mechanism fails and is in a powered state, the end fuel cells may dry out, thereby leading to an electrical short in the fuel cell assembly. Other methods for heating the end plates include catalytic heating, and providing a bypass plate disposed between the end plates and the terminal plates.

Also, during operation of the fuel cell assembly, electrical current generated by the fuel cell stack is collected in each electrically conductive fuel cell. The current is transmitted through the stacks, via the fuel cell plates, to terminal plates at either end of the fuel cell stack. The terminal plates are in electrical communication with a current collecting body, such as a bus bar, for example. The current collecting body is in electrical communication with a stack interface unit (SIU) or other electrical components of the fuel cell power system. High temperatures in the stack end units will cause heat to flow with the electrical current to the SIU and/or other electrical components, thereby resulting in increased temperatures in the SIU and/or other electrical components which may result in component failure or requiring costly components that can operate at elevated temperatures.

It would be desirable to develop a fuel cell assembly having a barrier layer disposed between a terminal plate and an end plate thereof, the barrier layer having variable properties to facilitate startup thereof in freezing external temperatures and to minimize the temperature in an end unit of the assembly at high current levels.

SUMMARY OF THE INVENTION

Concordant and congruous with the present invention, a barrier layer disposed between a terminal plate and an end plate thereof, the barrier layer having variable properties to facilitate startup thereof in freezing external temperatures and to minimize the temperature in an end unit of the assembly at high current levels, has surprisingly been discovered.

In one embodiment, a fuel cell assembly comprises a plurality of fuel cell plates arranged in a stack, each of said fuel cell plates having reactant inlets and reactant outlets and a coolant inlet and a coolant outlet; a first terminal plate disposed at a first end of the stack of said fuel cell plates; and a barrier layer disposed between one of said plurality of fuel cell plates and said first terminal plate to provide a thermal barrier therebetween, wherein said barrier layer includes a first portion having a first thermal conductivity and a second portion having a second thermal conductivity.

In another embodiment, a fuel cell assembly comprises a pair of terminal plates, one of said terminal plates disposed at each end of the fuel cell assembly; a pair of end fuel cell plates disposed between said terminal plates; a plurality of fuel cell plates arranged in a stack and disposed between said end fuel cell plates; and a pair of barrier layers each having a first portion having a first thermal conductivity and a second portion having a second thermal conductivity, each barrier layer disposed between one of said end fuel cell plates and one of said terminal plates to provide a thermal barrier therebetween.

In another embodiment, a fuel cell assembly comprises a pair of terminal plates, one of said terminal plates disposed at each end of the fuel cell assembly; a pair of end fuel cell plates disposed between said terminal plates; a plurality of fuel cell plates arranged in a stack and disposed between said end fuel cell plates; and a pair of barrier layers each having a first portion having a first thermal conductivity and a second portion having a second thermal conductivity lower than the first thermal conductivity, each barrier layer disposed between one of said end fuel cell plates and one of said terminal plates to provide a thermal barrier therebetween.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
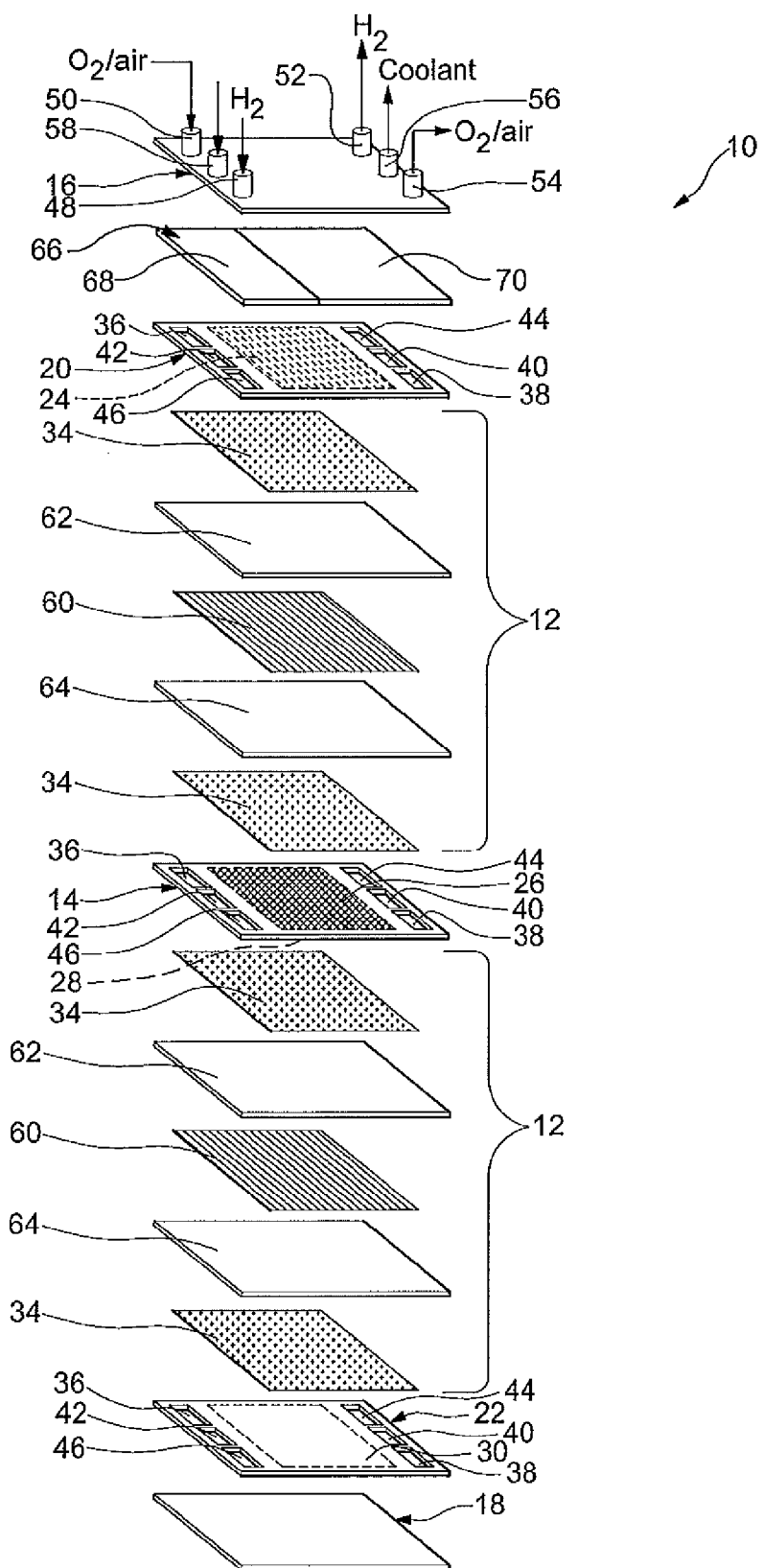
FIG. 1 is an exploded perspective view of a fuel cell assembly including a barrier layer according to an embodiment of the invention.
Figure 2:
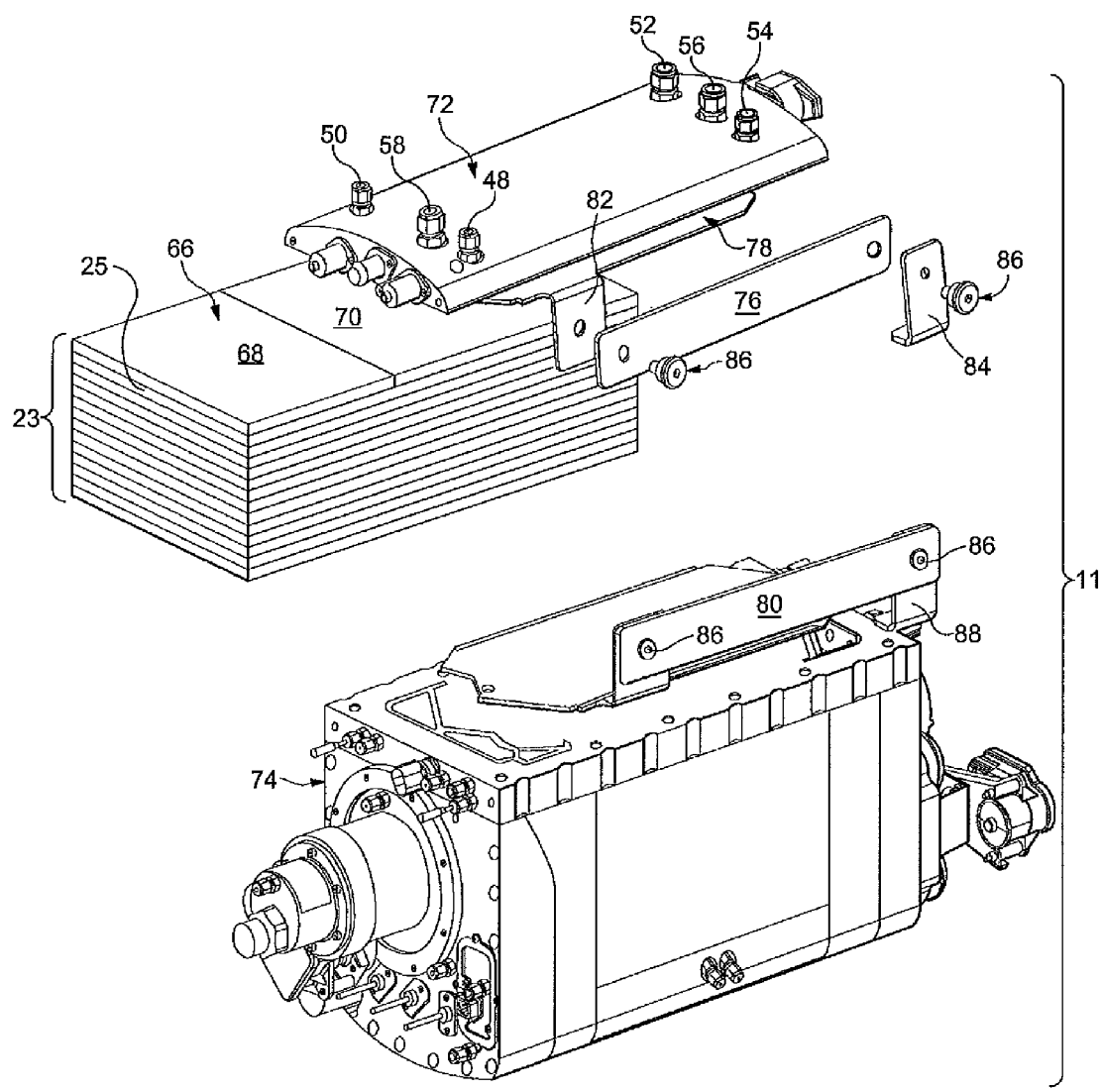
FIG. 2 is a partially exploded perspective view of fuel cell power system incorporating the barrier layer shown in FIG. 1.

FIG. 1 depicts a fuel cell assembly 10 having a two-cell fuel cell stack. The fuel cell assembly 10 is a proton exchange membrane (PEM) fuel cell assembly. Each of the two fuel cells includes a unitized electrode assembly (UEA) 12. The UEAs 12 are separated from each other by an electrically conductive bipolar plate 14. The UEAs 12 have anode and cathode diffusion media (DM) 34, anode 62 and cathode 64 electrodes, and an electrolyte membrane 60. For simplicity, a fuel cell assembly 10 with a two-cell fuel cell stack (i.e. one bipolar plate) is illustrated and described in FIG. 1, it being understood that a typical fuel cell assembly has many more such fuel cells and bipolar plates. As explained in more detail below, FIG. 2 shows a fuel cell power system 11 having a fuel cell assembly 23 similar to the fuel cell assembly 10 but having more than two fuel cells.

The UEAs 12 and bipolar plate 14 are stacked together between a pair of terminal plates 16, 18 and a pair of unipolar end plates 20, 22. The unipolar end plate 20, both working faces of the bipolar plate 14, and the unipolar end plate 22 include respective active areas 24, 26, 28, 30. The active areas 24, 26, 28, 30 typically contain flow fields for distributing gaseous reactants such as hydrogen gas and air over an anode and a cathode, respectively, of the UEAs 12. A barrier layer 66 is disposed between the terminal plate 16 and the end plate 20.

The bipolar plate 14 is typically formed by a conventional process for shaping sheet metal such as stamping, machining, molding, or photo etching through a photolithographic mask, for example. In one embodiment, the bipolar plate 14 is formed from unipolar plates which are then joined by any conventional process such as welding or adhesion. It should be further understood that the bipolar plate 14 may also be formed from a composite material. In one particular embodiment, the bipolar plate 14 is formed from a graphite or graphite-filled polymer. Gas-permeable diffusion media 34 are disposed adjacent the both sides of the bipolar plate 14. The end plates 20, 22 are also disposed adjacent the diffusion media 34.

The barrier layer 66 includes a first portion 68 and a second portion 70. The first portion 68 has a thermal conductivity that is greater than a thermal conductivity of the second portion 70. The portions 68, 70 of the barrier layer 66 may be formed from an electrically conductive material, such as a carbon foam, a carbon cloth, or a carbon paper, for example. The portions 68, 70 of the barrier layer 66 may be formed from separate materials joined together by sintering, an adhesive, or the like, for example. The portions 68, 70 may also be formed from the same material having a thermal conductivity gradient between the first portion 68 and the second portion 70. To ensure a thermal conductivity of the first portion 68 is greater than that of the second portion 70, the portions 68, 70 may differ in respective carbon densities; may be formed at different processing temperatures; and may respectively be formed from a graphitized foam and a coal-based material. It is understood that the barrier layer 66 may be formed from more than the first portion 68 and the second portion 70. The barrier layer 66 may include any desired number of portions, such as a third portion (not shown) and a fourth portion (not shown), for example. It is further understood that the barrier layer 66 may be formed from a single layer of material having the thermal conductivity gradient, or another property gradient.

The bipolar plate 14, unipolar end plates 20, 22, and the UEAs 12 each include a cathode supply aperture 36 and a cathode exhaust aperture 38, a coolant supply aperture 40 and a coolant exhaust aperture 42, and an anode supply aperture 44 and an anode exhaust aperture 46. Supply manifolds and exhaust manifolds of the fuel cell assembly 10 are formed by an alignment of the respective apertures 36, 38, 40, 42, 44, 46 in the bipolar plate 14, unipolar end plates 20, 22, and the UEAs 12. The hydrogen gas is supplied to an anode supply manifold via an anode inlet 48. The air is supplied to a cathode supply manifold of the fuel cell assembly 10 via a cathode inlet 50. An anode outlet 52 and a cathode outlet 54 are also provided for an anode exhaust manifold and a cathode exhaust manifold, respectively. A coolant inlet 58 is provided for supplying liquid coolant to a coolant supply manifold. A coolant outlet 56 is provided for removing coolant from a coolant exhaust manifold. It should be understood that the configurations of the various inlets 48, 50, 58 and outlets 52, 54, 56 in FIG. 1 are for the purpose of illustration, and other configurations may be chosen as desired.

UEAs 12 for use in the fuel cell assembly 10 may include a plurality of components. As best shown in FIG. 1, the UEA 12 includes the electrolyte membrane 60, the anode 62, the cathode 64, and the diffusion media 34. The components of the UEA 12 are assembled during production of the UEA 12 and affixed to one another by any conventional process such as hot pressing, for example. An adhesive may be used between individual components, as desired.

The anode 62 and the cathode 64 of the fuel cell assembly 10 may be disposed on the electrolyte membrane 60 and/or the diffusion media 34. Either the anode 62 or the cathode 64 can be referred to as an electrode. The electrodes 62, 64 may be formed by a catalyst ink applied to the components by any conventional process such as spraying, dipping, brushing, roller transfer, slot die coating, gravure coating, Meyer rod coating, decal transfer, and printing, for example.

The electrolyte membrane 60 may be a membrane layer formed from an ionomer. The ionomer perfluorosulfonic acid (PFSA) such as sold under the trademark Nafion® NRE211, is a typical ionomer well known in the art for use as the electrolyte membrane 60 of a fuel cell. The electrolyte membrane 60 is disposed between the anode 62 and the cathode 64.

According to an embodiment of the invention, FIG. 2 shows a fuel cell assembly 23 having a desired number of fuel cells in a stack similar to the two fuel cell stack assembly 10 of FIG. 1. The fuel cell assembly 23 includes the barrier layer 66 shown in FIG. 1. The reactant and coolant inlets and outlets of the fuel cell power system 11 are similar in orientation and flow direction to those of the fuel cell assembly 10 and thus, include the same reference numerals.

The fuel cell assembly 23 is disposed in the fuel cell power system 11 between a lower end unit 74 and a terminal current collector plate 78 adjacent an upper end unit 72. The barrier layer 66 is disposed between the terminal collector plate 78 and an end fuel cell 25 of the fuel cell assembly 23 with the first portion 68 adjacent the cathode inlet 50 and the coolant inlet 58, and the second portion 70 is adjacent an active area of the end fuel cell 25, the cathode outlet 48, and the coolant outlet 56. An electrical connector 76 is coupled to a contact tab 82 of the terminal collector plate 78 and a contact tab 84 of the fuel cell power system 11. The contact tab 84 is in electrical communication with another component of the fuel cell power system 11 such as a stack interface unit (SIU) (not shown), another fuel cell stack (not shown), or other electrical components of the fuel cell power system 11, for example. A second electrical connector 80 is coupled to the lower end unit 74 and a contact tab 88. The contact tab 88 is in electrical communication with another component of the fuel cell power system 11 such as the SIU, another fuel cell stack, or other electrical components of the fuel cell power system 11, for example. It is understood that the contact tab 88 may be any device adapted to provide electrical communication between the fuel cell power system 11 and the other component, such as a wire, a disconnect unit, and the like, for example. The electrical connector 76 is in electrical communication with the anode side of the fuel cell assembly 23 and the electrical connector 80 is in electrical communication with the cathode side of the fuel cell stack 23. The electrical connectors 76, 80 are coupled to the respective components of the fuel cell power system 11 with suitable fasteners 86, as is known in the art.

Generally, during operation of the fuel cell power system 11, a stream of hydrogen is fed into the anode side of the fuel cell assembly 23 through the anode inlet 48. Concurrently, a stream of oxygen is fed into the cathode side of the fuel cell assembly 23 through the cathode inlet 50. On the anode side, the hydrogen in the hydrogen stream is catalytically split into protons and electrons. The oxidation half-cell reaction is represented by: $H_2 \leftrightarrow 2H^+ + 2e^-$. In a PEM fuel cell, the protons permeate through the membrane to the cathode side. The electrons travel along an external load circuit to the cathode side creating the current of electricity of the fuel cell assembly 23. The current of electricity is collected in collector plates disposed at each end of the fuel cell assembly 23, such as the collector plate 78. The current of electricity is then caused to flow from the collector plates through the electrical connectors 76, 80 and to the various components of the fuel cell power system 11. Because the current of all the electricity in the collector plates flow through the electrical connectors 76, 80, the area where the connectors 76, 80 attach to the collector plates typically generates more thermal energy than the area of the collector plates spaced apart from the attachment point to the connectors 76, 80. On the cathode side, the oxygen in the oxidant stream combines with the protons permeating through the membrane and the electrons from the external circuit to form water molecules. This reduction half-cell reaction is represented by: $4H^+ + 4e^- + O_2 \leftrightarrow +2H_2O$. Anode exhaust from the anode side is typically recirculated through the system to maintain high anode conversion to electricity and low hydrogen emissions.

Cathode exhaust from the cathode side is exhausted to atmosphere. A control module (not shown) regulates the conditions of the hydrogen stream, oxygen stream, and exhaust streams by operating various control valves (not shown), and compressors (not shown) in response to signals from pressure sensors (not shown) and electrical power sensors (not shown) connected to the fuel cell assembly 23. One exemplary exhaust system is disclosed in commonly-owned U.S. Pat. No. 7,235,318 for FUEL CELL SYSTEM BACK-PRESSURE CONTROL WITH A DISCRETE VALVE, hereby incorporated herein by reference in its entirety.

When a startup operation of the fuel cell power system 11 is conducted when the ambient temperature is near or below freezing, it is desirable to warm up the fuel cell power system 11 as quickly as possible, while maintaining a desired level of performance of the fuel cell assembly 23. During the startup operation of the fuel cell power system 11, hydrogen gas is caused to flow into the anode inlet 48 and an oxidant, such as oxygen or air, is caused to flow into the cathode inlet 50. Collectively, the hydrogen gas and the oxidant are referred to as "the reactants". Simultaneously, coolant is caused to flow into the fuel cell power system 11 through the coolant inlet 56.

As described hereinabove, the first portion 68 of the barrier layer 66 is disposed adjacent the reactant inlets 48, 50 and the coolant inlet 58. Because the second portion 70 of the barrier layer has a lower thermal conductivity than the first portion 70, the second portion 70 insulates and keeps thermal energy generated by the reaction of the reactants within the portions of the fuel cell assembly 23 adjacent the second portion 70, thereby facilitating a heating up of the fuel cell assembly 23 during the startup operation. Without the insulating second portion 70, thermal energy may be lost to surrounding components of the fuel cell assembly 23, such as the upper end unit 72, for example. By having a lower thermal conductivity, the second portion 70 also has a lower electrical conductivity. However, the inflowing reactants are at a maximum concentration at the inlets for the reactants. Therefore, a greater amount of electrical current is generated at the inlets of the plates of the fuel cell assembly 23 than at any other portion of the plates. The relatively higher electrical conductivity of the first portion 68 of the barrier layer 66 will reduce the amount of thermal energy generated in this portion of the barrier layer 66 when operating at high current levels. By minimizing the thermal energy generated in the barrier layer and subsequently transferred to the upper end unit 72, the thermal energy tolerance of the upper end unit 72 is minimized. By minimizing the required thermal energy tolerances of the upper end unit 72, specialty plastics are not required for manufacturing thereof and the cost to manufacture the upper end unit 72 is minimized. Furthermore, because the coolant flowing through the fuel cell assembly 23 to the coolant outlet 56 has absorbed thermal energy from the reactant reactions in each of the fuel cells, the insulating second portion 70 keeps thermal energy in the coolant stream in the fuel cell assembly 23, further minimizing the startup time thereof.

As described hereinabove, the first portion 68 of the barrier layer 66 is disposed adjacent the reactant outlets 52, 54 and the coolant outlet 56. Because the first portion 68 of the barrier layer has a greater thermal conductivity than the second portion 70, the first portion 68 conducts thermal energy away from the active area and the outlets of the fuel cell assembly 23. By having a greater thermal conductivity, the first portion 68 also has a greater electrical conductivity. By maximizing the electrical conductivity in the first portion 68, the voltage measured at the electrical connectors 76, 80 is maximized, thereby maximizing the power output of the fuel cell power system 11. This is of particular importance during peak usage of the fuel cell power system 11.

As described hereinabove, the higher relative electrical conductivity of the first portion 68 minimizes the temperature of the upper end unit 72. The electrical connectors 76, 80 of the fuel cell assembly 23 are in thermal and electrical communication with the end units 72, 74 as well as various components of the fuel cell power system 11 via the contact tabs 84, 88. Therefore, minimizing the temperature of the upper end unit 72 mitigates the need for separate cooling systems and other thermal energy management systems in the various components of the fuel cell power system 11, such as the SIU. By mitigating the need for separate cooling systems for other components of the fuel cell power system 11, the cost and complexity of the fuel cell power system 11 is minimized.

Figure 3:
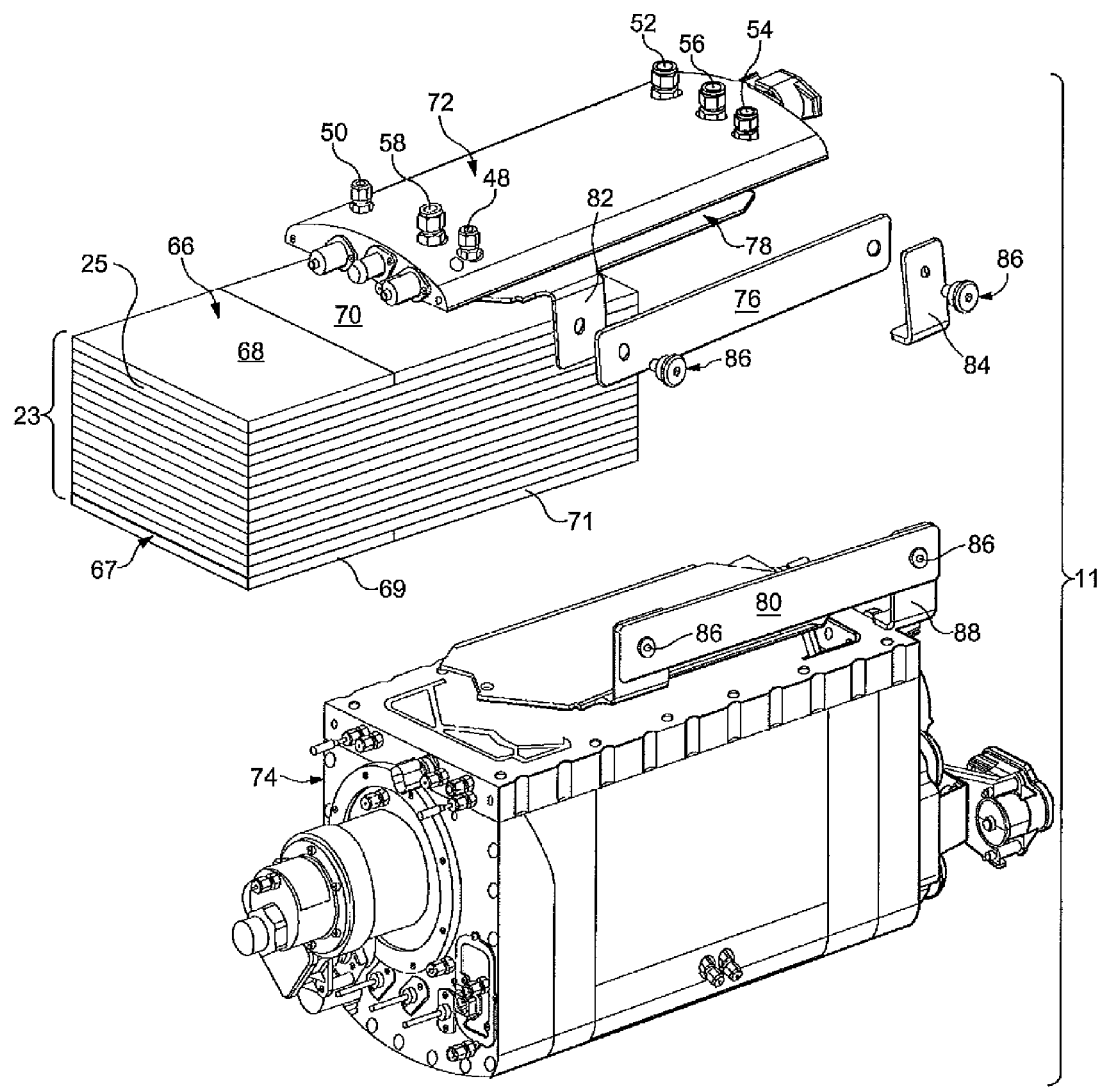
FIG. 3 is a partially exploded perspective view of fuel cell power system incorporating a plurality of the barrier layers shown in FIG. 1

Similar to the embodiment shown in FIG. 2, FIG. 3 shows another embodiment of the invention. The fuel cell assembly 23 of FIG. 3 includes a second barrier layer 67 similar to the barrier layer 66 disposed at an opposite end of the fuel cell assembly 23 adjacent the lower end unit 74. A first portion of the second barrier layer 69 is disposed adjacent the end of the fuel cell power system 11 with the reactant inlets 48, 50 and the coolant inlet 58. A second portion 71 of the second barrier layer 67 is disposed adjacent the end of the fuel cell power system 11 with the reactant outlets 52, 54 and the coolant outlet 56. The second barrier layer 67, like the barrier layer 66, militates against the loss of thermal energy to the lower end unit 74 during warmup while also minimizing the temperature of the lower end unit 74 during high current operation. Thus the thermal energy tolerance of the lower end unit 74 is minimized, thereby minimizing the cost of fabrication thereof. Similar to the barrier layer 66, the orientation of the second barrier layer 67 within the fuel cell assembly 23 facilitates a more rapid startup time thereof and maximizes the voltage during peak operation thereof.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
   a plurality of fuel cell plates arranged in a stack, each of said fuel cell plates having reactant inlets and reactant outlets and a coolant inlet and a coolant outlet;
   a first terminal plate disposed at a first end of the stack of said fuel cell plates; and
   a barrier layer disposed between one of said plurality of fuel cell plates and said first terminal plate to provide a thermal barrier therebetween, wherein said barrier layer includes a first portion having a first thermal conductivity and a second portion having a second thermal conductivity.

2. The fuel cell assembly of claim 1, wherein said barrier layer is formed from an electrically conductive material.

3. The fuel cell assembly of claim 1, wherein the first thermal conductivity is greater than the second thermal conductivity.

4. The fuel cell assembly of claim 1, wherein the first portion of said barrier layer is disposed adjacent the cathode inlet of said fuel cell plates.

5. The fuel cell assembly of claim 1, wherein the second portion of said barrier layer is disposed adjacent the cathode inlet of said fuel cell plates.

6. The fuel cell assembly of claim 1, further comprising a second terminal plate disposed at a second end of the stack of said fuel cell plates.

7. The fuel cell assembly of claim 6, further comprising a second barrier layer disposed between another of said fuel cell plates and said second terminal plate to provide a thermal barrier therebetween, wherein said second barrier layer includes a first portion having a first thermal conductivity and a second portion having a second thermal conductivity.

8. The fuel cell assembly of claim 1, further comprising an electrical connector having a first end adjacent the coolant inlet of the fuel cell plates, the first end of the electrical connector adapted to provide electrical communication between said first terminal plate and an electrical component.

9. The fuel cell assembly of claim 1, wherein the first portion of said barrier layer is formed separately from the second portion of said barrier layer.

10. The fuel cell assembly of claim 1, wherein the first portion of said barrier layer and the second portion of said barrier layer are formed from a single material having a thermal conductivity gradient.

11. The fuel cell assembly of claim 10, wherein the thermal conductivity gradient results from varying carbon densities of the first portion and the second portion.

12. The fuel cell assembly of claim 10, wherein the thermal conductivity gradient results from different processing temperatures of the first portion and the second portion.

13. A fuel cell assembly comprising:
   a pair of terminal plates, one of said terminal plates disposed at each end of the fuel cell assembly;
   a pair of end fuel cell plates disposed between said terminal plates;
   a plurality of fuel cell plates arranged in a stack and disposed between said end fuel cell plates; and
   a pair of barrier layers each having a first portion having a first thermal conductivity and a second portion having a second thermal conductivity, each barrier layer disposed between one of said end fuel cell plates and one of said terminal plates to provide a thermal barrier therebetween.

14. The fuel cell assembly of claim 13, wherein the first thermal conductivity is greater than the second thermal conductivity.

15. The fuel cell assembly of claim 13, wherein the first portion of said barrier layer is disposed adjacent the cathode inlet of said fuel cell plates.

16. The fuel cell assembly of claim 13, further comprising a second terminal plate disposed at a second end of the stack of said fuel cell plates.

17. The fuel cell assembly of claim 13, wherein the first portion of said barrier layer and the second portion of said barrier layer are formed from a single material having a thermal conductivity gradient.

18. The fuel cell assembly of claim 17, wherein the thermal conductivity gradient results from the first portion being formed from a first material and the second portion formed from a second material.

19. A fuel cell assembly comprising:
 a pair of terminal plates, one of said terminal plates disposed at each end of the fuel cell assembly;
 a pair of end fuel cell plates disposed between said terminal plates;
 a plurality of fuel cell plates arranged in a stack and disposed between said end fuel cell plates; and
 a pair of barrier layers each having a first portion having a first thermal conductivity and a second portion having a second thermal conductivity lower than the first thermal conductivity, each barrier layer disposed between one of said end fuel cell plates and one of said terminal plates to provide a thermal barrier therebetween.

20. The fuel cell assembly of claim 1, wherein the first thermal conductivity is greater than the second thermal conductivity and the first portion of said barrier layer is disposed adjacent the coolant inlet of said fuel cell plates.

* * * * *